Figure 1:
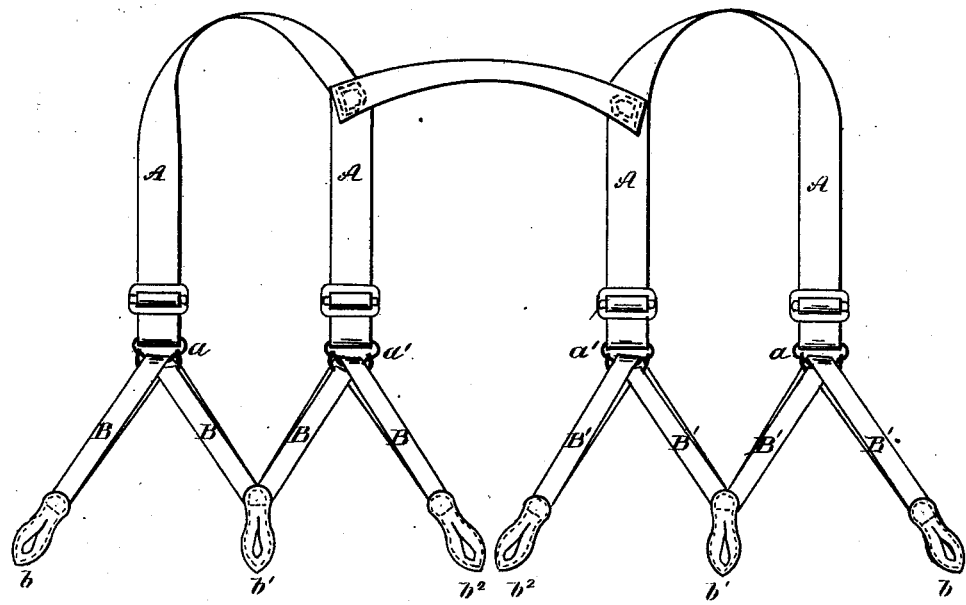

B. J. GREELY.
Suspenders

No. 206,013. Patented July 16, 1878.

Witnesses
George O. G. Evans.
C. H. Slade.

Inventor
B. J. Greely
by J. E. Maynadier
his atty

UNITED STATES PATENT OFFICE.

BENJAMIN J. GREELY, OF BOSTON, MASSACHUSETTS.

IMPROVEMENT IN SUSPENDERS.

Specification forming part of Letters Patent No. 206,013, dated July 16, 1878; application filed December 1, 1877.

*To all whom it may concern:*

Be it known that I, BENJAMIN J. GREELY, of Boston, in the county of Suffolk and State of Massachusetts, have invented an Improvement in Suspenders, of which the following is a full, clear, exact, and concise description, when taken in connection with the accompanying drawings, making part hereof.

In the drawings, A A are the shoulder-straps, of any proper construction, and B B' are the button-straps, which, it will be seen, are arranged in the form of an M; and it is this arrangement of the button-straps in relation to the shoulder-straps, the front and rear ends of each shoulder-strap being connected together by one of the M-straps, making suspenders consisting of two shoulder-straps and two M button-straps, which constitutes the distinguishing characteristic of my invention.

Figure 2:
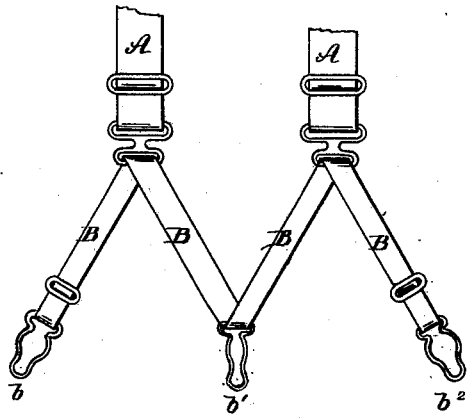

The button-straps B or B' may be formed of one piece of material, as shown in Fig. 2, and may be arranged to render through all three of the button-like devices $b$ $b^1$ $b^2$; but I prefer to secure $b^1$ in place, as shown in the other figures.

Figure 3:
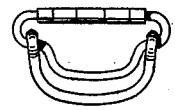

Figure 1 shows that form of my invention which I manufacture mainly. The button-straps are double, and a double bar device is used at $a$ $a'$. The lower angle of the M is secured to $b^1$; but the straps are free to render at the upper angles of the M—that is, at $a$ and $a'$. The double bar device is shown detached at Fig. 3. A buckle may be substituted for the upper cross-bar of this device, and the double lower bars are not essential, many of these suspenders having been made and sold by me with a single lower bar on the device connecting the shoulder-straps A A with M button-straps B B' like those shown in Fig. 1.

It is obvious that the M button-straps may be in three or four pieces instead of one; but I prefer in all cases to permit the straps to render at $a$ and $a'$.

A single M button-strap is shown in Patent No. 140,652, dated July 8, 1873, but is there used to connect the front end of one of the shoulder-straps with the front end of the other shoulder-strap. This I disclaim, my invention being made up of two shoulder-straps and two M button-straps, one connecting the front and rear ends of one of the shoulder-straps, and the other the front and rear ends of the other shoulder-straps.

What I claim as my invention is—

The suspenders above described, consisting of the shoulder-straps A A and M button-straps B B', the front and rear ends of one shoulder-strap being connected by B, and of the other shoulder-strap by B', as set forth.

B. J. GREELY.

Witnesses:
J. E. MAYNADIER,
GEORGE O. G. COALE.